United States Patent
Owhadi et al.

(10) Patent No.: US 8,078,670 B2
(45) Date of Patent: Dec. 13, 2011

(54) METHOD AND APPARATUS FOR PROVIDING SUPPORT FOR AN ELECTRONIC DEVICE

(75) Inventors: Eric Owhadi, Tomball, TX (US); Mahmoud Bouchemoua, Saint Martin d'Heres (FR); Christophe Le-Rouzo, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2504 days.

(21) Appl. No.: 10/852,850

(22) Filed: May 24, 2004

(65) Prior Publication Data
US 2005/0060398 A1    Mar. 17, 2005

(30) Foreign Application Priority Data
Jun. 2, 2003  (EP) ...................................... 03291306

(51) Int. Cl.
*G06F 15/16*  (2006.01)
(52) U.S. Cl. ......... 709/203; 709/223; 709/224; 709/228
(58) Field of Classification Search ................... 709/203, 709/223–224, 228
See application file for complete search history.

(56) References Cited

U.S. PATENT DOCUMENTS

| | | | |
|---|---|---|---|
| 5,367,667 A | 11/1994 | Wahlquist et al. | 395/575 |
| 5,678,002 A | 10/1997 | Fawcett et al. | 395/183.01 |
| 5,732,268 A * | 3/1998 | Bizzarri | 713/2 |
| 5,854,828 A | 12/1998 | Kocis et al. | 379/93.31 |
| 5,983,369 A | 11/1999 | Bakoglu et al. | 714/46 |
| 6,145,096 A | 11/2000 | Bereiter et al. | 714/25 |
| 6,230,287 B1 * | 5/2001 | Pinard et al. | 714/31 |
| 6,289,378 B1 * | 9/2001 | Meyer et al. | 709/223 |
| 6,321,262 B1 | 11/2001 | Springer | |
| 6,357,017 B1 * | 3/2002 | Bereiter et al. | 714/27 |
| 6,377,944 B1 * | 4/2002 | Busey et al. | 1/1 |
| 6,397,245 B1 * | 5/2002 | Johnson, II et al. | 709/203 |

(Continued)

FOREIGN PATENT DOCUMENTS
DE       100 08 674 A1     5/2001
(Continued)

OTHER PUBLICATIONS
FOLDOC, Dictionary Defination.*
(Continued)

*Primary Examiner* — Emmanuel L. Moise
*Assistant Examiner* — Waseem Ashraf

(57) ABSTRACT

A support system enables a support agent to assist a client to resolve a problem with a client electronic device provided with an Internet capability enabling communication between the device and a support service web application. A two-way communications link is provided between the agent and the same web application. Communication between the client and support agent is provided by a telephone link. Accessible by the device is a diagnostic and/or data harvesting engine which can diagnose and/or harvest data for transfer to the web application and which has access to a LAN software stack which enables the engine itself to establish communication with the web application without requiring user intervention and without requiring communication via a web server provided in the client's device. Thus, as long as it is still possible for the device to communicate via the Internet, the diagnostic/data harvesting engine has the ability to carry out such communication to provide the required data to the web application. The support agent has access to the collected data stored in the application to be able to diagnose and resolve problems with the device.

20 Claims, 1 Drawing Sheet

U.S. PATENT DOCUMENTS

| | | | | |
|---|---|---|---|---|
| 6,438,711 | B2 * | 8/2002 | Woodruff | 714/27 |
| 6,477,531 | B1 | 11/2002 | Sullivan et al. | |
| 6,662,316 | B1 | 12/2003 | Owhadi | 714/46 |
| 6,691,230 | B1 * | 2/2004 | Bardon | 726/27 |
| 6,694,314 | B1 | 2/2004 | Sullivan et al. | 707/10 |
| 6,697,969 | B1 | 2/2004 | Merriam | |
| 7,165,194 | B2 | 1/2007 | Paradkar | 714/57 |
| 2001/0018691 | A1 | 8/2001 | Sakakibara et al. | 707/104.1 |
| 2001/0027470 | A1 | 10/2001 | Ulmer | 709/203 |
| 2001/0047410 | A1 * | 11/2001 | Defosse | 709/224 |
| 2002/0052912 | A1 * | 5/2002 | Griswold et al. | 709/200 |
| 2002/0097254 | A1 | 7/2002 | Simmons | 345/705 |
| 2002/0154153 | A1 | 10/2002 | Messinger et al. | 345/705 |
| 2002/0165952 | A1 | 11/2002 | Sewell et al. | 709/224 |
| 2002/0184341 | A1 | 12/2002 | Bhatti et al. | 709/219 |
| 2003/0037293 | A1 * | 2/2003 | Owhadi | 714/46 |
| 2004/0148385 | A1 * | 7/2004 | Srinivasan et al. | 709/224 |
| 2004/0153712 | A1 | 8/2004 | Owhadi et al. | 714/4 |

FOREIGN PATENT DOCUMENTS

| | | |
|---|---|---|
| EP | 0 952 521 A2 | 10/1999 |
| EP | 1 256 144 B1 | 11/2002 |
| WO | 00/27847 | 5/2000 |
| WO | 00/41535 | 7/2000 |
| WO | 00/68793 | 11/2000 |

OTHER PUBLICATIONS

Pawlan, et al., "Signed Applets, Browsers, and File Access", pp. 1-5 (Apr. 1998).

Indigo Rose Software Forums, "AutoPlay After Restart", p. 1 (Mar. 22, 2001).

"Support FetchDog™," Internet: <http://www.4developers.com/fd/> pp. 1-3 (Retrieved on Oct. 30, 2001).

"Test: Speicher im Web," Internet: <http://www.tecchannel.de/internet/181/index.html> Retrieved on Nov. 16, 2001, pp. 1-8 (Sep. 9, 1999).

"Today's News," Internet: <http://www.realmarket.com/ssdex01/ssdex032001.html> Retrieved on Oct. 30, 2001, pp. 1-2 (Mar. 20, 2001).

* cited by examiner

METHOD AND APPARATUS FOR PROVIDING SUPPORT FOR AN ELECTRONIC DEVICE

CROSS REFERENCE TO RELATED APPLICATIONS

The subject matter of the present application may be related to the following U.S. Patent Applications: "Providing Access To Diagnostic Information To An Interested Party, Such As A Computer Remote Support Agent," Ser. No. 10/165,863, filed Jun. 7, 2002; and "Technical Support Systems And Methods For Use In Providing Technical Support," Ser. No. 10/652,892, filed Aug. 29, 2003.

FIELD OF THE INVENTION

The present invention relates to apparatus for and a method of providing support for an electronic device, for example for troubleshooting purposes. The device may be a computer.

BACKGROUND OF THE INVENTION

It is well known to provide support for computers and peripheral devices by remote access, typically by telephone, to a support service. For example, when a user has difficulty with his/her computer, the user can telephone a support service centre and be taken through a diagnostic procedure with a support agent to try to determine the nature of the problem and possible solutions. This often saves having to return the computer to a service centre, at significant cost, by solving the problem remotely. It can also provide additional support for users who may, for example, simply be having difficulties operating the computer rather than there being any technical problem with the computer or peripheral device.

Most computer systems now provide the user with details of an operational error, by displaying a malfunction message on the user's computer or other device. Often, this message does not assist the user to solve the problem personally but is important to the support agent, who is able to interpret and understand the message. Thus, it has been known for the support agent to ask for details of any malfunction message provided by the device, together with information regarding the system configuration. Relaying this information can, however, be problematic. For example, it may have to be printed off and sent by facsimile. Not only may this not be possible, depending upon the nature of the problem and the user's resources, but it can be sufficiently inconvenient that the user and support agent tend instead to try to relay the information verbally over the telephone.

A system addressing this problem is disclosed in the assignee's earlier European patent application no. EP-A-1,265,144. This system provides for a user to be guided by a support agent during a telephone call to open the user's web browser, to connect to a support website and to send a trouble ticket (diagnostic results and system configuration) to the website. The connection allows the sharing of data from the user's computer with the support agent's computer so that the support person can carry out troubleshooting tasks under supervision of the user.

Although this method works well in many circumstances, it requires the ability of the user to launch the web browser and requires the computer's operating system to be substantially intact.

SUMMARY OF THE PRESENT INVENTION

The present invention seeks to provide improved apparatus for and a method of supporting an electronic device.

According to an aspect of the present invention, there is provided a method of supporting remotely a user electronic device having an operating system for operating the device, including the steps of providing a diagnostic and/or data harvesting engine for the electronic device which includes at least one procedure for diagnosing the operational state of the device and/or harvesting data relating to the device; providing independent Internet access software which is independent of the operating system of the device; using Internet access software of the device or the independent Internet access software to access a support website; and transmitting to the website the results of the procedure for access by a support service.

Advantageously, the support website has a fixed address (URL).

Preferably, the method includes the step of transmitting system configuration to the support service for diagnosis.

The method does not require the electronic device to be in a state in which its web browser software or operating system are functional nor does it require the electronic device to have any such capability. All that is required is for the device to be Internet enabled. Thus, the method can be used in many more circumstances than can the prior art methods.

In the preferred embodiment, the independent Internet access software includes at least one LAN driver, a TCP/IP stack and an HTTP stack. Advantageously, in the case of a personal computer, the HTTP stack provides for access to the Internet through a proxy/firewall. In other embodiments, other protocols and their associated ports could be used, such as FTP, TELNET and SOCKS 4/5.

In one embodiment, the independent Internet access software uses DHCP or static IP to obtain the IP address. There may also be provided an auto-proxy stack.

It is envisaged that the independent Internet access software could be provided on a boot disc (for example, a floppy disc or CD-ROM), in a hidden partition in a hard disc drive of the device, by a LAN connection (for example, for remote boot), by a USB boot device or could be ROM embedded (for example directly inside the device's BIOS).

In the preferred embodiment, the method provides for the independent Internet access software to be copied from the device's proxy settings and IP settings from the device's operating system during normal functioning of the device and to store those settings in a separate memory, such as one or more of those described above.

At the support side, the method provides for a support agent to access the website, preferably via a web browser, to access the results of the procedure and system configuration (usefully referred to as the trouble ticket) of the user's device. The support agent can thus have easy access to this data to assist in solving the problem with the device.

In the preferred embodiment, the method includes the steps of providing for the user to access the website, for the web application to establish a unique identifier for the user and to transmit this identifier to the user. The user then provides the identifier to the support agent to allow the support agent to access the trouble ticket of that user's device.

In the preferred embodiment, it is the web application which generates an identifier. In an alternative embodiment, the user provides the identifier which is checked for conflict with identifiers in use by other users, verified as unique or otherwise, with the result of the verification transmitted to the user.

The identifier could be a code, preferably a number such as a six digit number, a coded sound or any other suitable identifier. It could, for example, be the manufacturer's serial number and/or model number of the device.

Transmission of the identifier by the user to the support agent could be by dictating the code over the telephone, by using the touch tone function of the telephone, by electronic sound (described below) and so on.

The method preferably provides for the support service to carry out repair or replacement of software or firmware of the user's device, through the web application. This could include implementing software updates.

According to another aspect of the present invention, there is provided apparatus for supporting remotely a user electronic device having an operating system for operating the device, including a diagnostic and/or data harvesting engine for the electronic device which includes at least one procedure for diagnosing the operational state of the device and/or harvesting data relating to the device, independent Internet access software which is independent of the operating system of the device, a transmission unit operable to use Internet access software of the device or the independent Internet access software to access a support web application and to transmit to the web application the results of the procedure for access by a support service.

DESCRIPTION OF THE DRAWINGS

Embodiments of the present invention are described below, by way of example only, with reference to the accompanying drawing, in which the sole FIGURE is a schematic diagram of a preferred embodiment of support system.

DESCRIPTION OF THE PREFERRED EMBODIMENT

Figure 1:
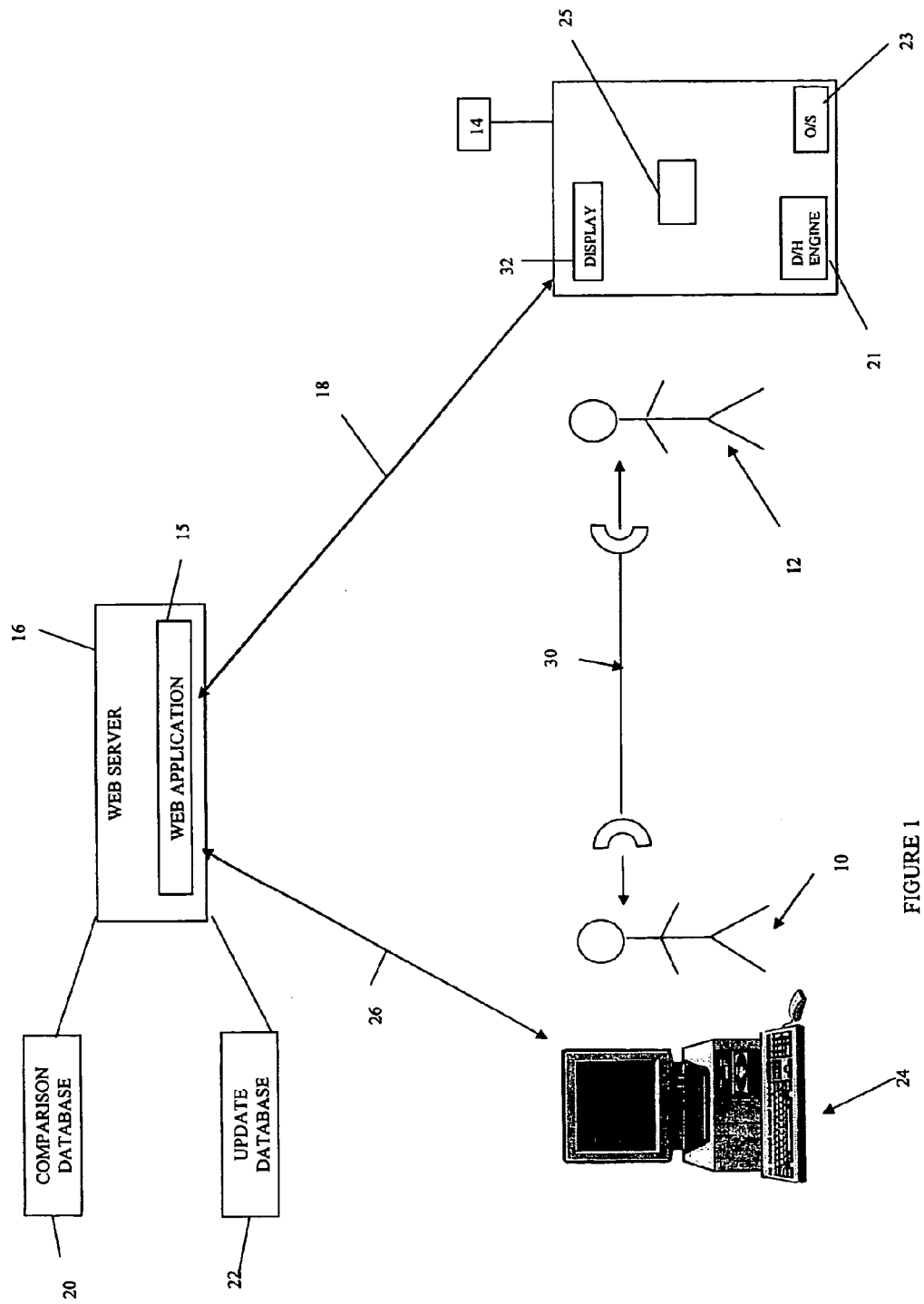

The FIGURE depicts an example of the preferred embodiment of support system by which a support agent 10 can assist a client 12 to resolve a problem with a client electronic device 14. The device 14 could be any device used by the client 12 which is provided with an Internet capability enabling communication between the device 14 and a web application 15 supported by a web server 16. In the embodiment shown, the client's device 14 is a personal computer. However, the system can be used to support many types of electronic device, including personal digital assistants (PDAs), electrical appliances such as refrigerators, televisions and so on, as long as these have been provided with an Internet access capability. The device is provided with a main operating system 23 which enables and controls operation of the device.

A two-way communications link 18, of any convenient type, is provided between the client 12 and the web server 16 supporting the web application 15.

The web application 15 is provided with a comparison database 20 which provides device software configuration details, BIOS data and the like for comparison, as explained below, with data gathered from the client's device 14. The web application is also provided with an update database 22, the purpose of which is also described in further detail below.

At the support site, the support agent 10 is provided, preferably, with a computer 24 by which the agent 10 can provide support to the client 12. A two-way Internet link 26 is provided between the agent computer 24 and the same web application 15 posted on the web server 16.

It is to be understood that the links 26 and/or 18 may include suitable firewalls that may be traversed using any suitable firewall crossing techniques, such as HTTP tunnelling.

Communication between the client 12 and support agent 10 is provided typically by a telephone link 30 so that direct human assistance can be provided to the user 12.

It is envisaged that the support agent 10 could provide, in addition to the extra services mentioned below, the same types of support to the client 12 as currently provided. These typically include guiding the client 12 as to the use of the appliance 14 and simple troubleshooting help in the case that the device 14 has at least some adequate functionality and any problems can be resolved at the client's location without further intervention. This assistance can, if necessary, be provided through the website 16.

Where it is not possible for the support agent 10 to solve the problem with the device 14 by a simple telephone call, the agent 10 will prompt the client 12 to launch a diagnostic and/or data harvesting engine 21 provided with the client's device 14 or will arrange for the downloading of the diagnostic and/or data harvesting engine 21 from the web server 16.

More specifically, either stored within the memory of the device 14 or located in a separate memory device, there is provided a diagnostic and/or data harvesting engine 21 which not only can diagnose and/or harvest data for transfer to the web application but also has access to a LAN software stack, preferably with HTTP, (referred to herein as Internet access software) inside the diagnostic/data harvesting environment itself. The purpose of such a feature is to enable the diagnostic/data harvesting engine 21 itself to establish communication with the web application 15 hosted on the web server 16 without requiring user intervention and without requiring communication via a web server provided in the client's device 14. As long as it is still possible for the device 14 to communicate via the Internet, the diagnostic/data harvesting engine 21 has the ability to carry out such communication and to provide the required data to the web application 15.

The diagnostic/data harvesting engine 21 could be stored in a separate memory within the device 14 or within a separate (preferably hidden) partition of the device 14. It may alternatively or additionally be stored outside the device 14, for example on a boot disc (floppy disc or CD-ROM), could be supplied via a LAN connection (such as by remote boot), by a USB boot device or could be ROM embedded, for example directly inside the device's BIOS. Of course, the diagnostic/data harvesting engine 21 could be provided in a plurality of locations so as to be available in a plurality of different states of the device 14. For example, if there is a fault in the main hard disk drive of the device 14, it may still be possible to access the diagnostic/data harvesting engine from a separate boot disk or other source.

The purpose of these features of the diagnostic/data harvesting engine 21 is that this can still operate even when the normal operating system of the device itself is not able to provide Internet access in the normal manner. For this purpose, the Internet access software 25 provided for the diagnostic/data harvesting engine 21, which is independent of the main operating system of the device, can be stored in the same location as the engine 21 and/or in a separate location. At least one version of the independent Internet access software 25 should be provided in a location which is separate from that of the operating system 23 of the device 14 so that even upon failure of the operating system 23 or any part thereof, the diagnostic/data harvesting engine 21 can still communicate with the web application 15.

The skilled person will appreciate that in the case of computers the normal operating system of the device could be any of the operating systems available for computers, including DOS™, Windows™, MacOS™, Unix™ and so on. In the case of other devices, the operating system will be the system which operates the device under normal circumstances.

It is envisaged in some embodiments that the diagnostic/data harvesting engine 21 would have the ability to read the Internet access software 25 from the memory of the device 14 while this is operating normally and to store a copy of that software at the different locations, that copy then representing the independent Internet access software.

In the preferred embodiment, the independent Internet access software 25 includes LAN drivers (for example UNDI-based or ODI drivers), a TCP/IP stack and an HTTP stack. Advantageously, in a case where the device 14 is a personal computer, the HTTP stack provides for access outside the Internet through a proxy/firewall. In other embodiments, other protocols and their associated reports could be used, such as FTP, TELNET and SOCKS 4/5. Optionally, the independent Internet access software 25 uses DHCP or static IP to obtain the IP address. There may also be provided an auto-proxy stack.

In some embodiments, the system provides for the engine 21 to retrieve the proxy settings and the IP settings from the main operating system 23 of the device 14 by reading the appropriate registry in the operating system 23.

It is preferred that the web application 15 has a fixed URL which can be permanently stored as part of the Internet access software 25, thus avoiding the need to find out the current URL of the support website 16.

Also provided with the client device 14 is a display 32 or other code receiving device. The display or code receiving device 32 is used, as described below, to advise the client 12 of an identification code provided by the web application 15. This identification code is required in the client's communications with the support agent 10.

In operation of the service, support is initially provided when the client 12 telephones a support service telephone number and establishes communication with the agent 10. As and when the support agent 10 determines that he/she requires further information as to the configuration and state of operation of the device 14, the support agent 10 will guide the client 12 as to how to launch the diagnostic/data harvesting engine 21. In a case that the device 14 retains adequate functionality, the diagnostic/data harvesting engine 21 can be run directly within the device 14. Otherwise, the support agent 10 will guide the client 12 in obtaining and launching the engine 21 from one of the other sources provided.

The engine 21, when activated, carries out standard diagnostic procedures and/or data harvesting procedures on the device 14 to obtain data as to the type of device 14 and the operating conditions of the various components of the device 14. The engine itself then establishes communication with the web application 15 via the communications link 18 by use of the Internet access software 25 with which it is associated.

Upon establishing communication between the device 14 and the web application 15, the engine 21 transfers to the web application the obtained data, which is then stored in an appropriate record in memory of the web application 15. Typically, the diagnostic/data harvesting engine 21 would transfer to the web application 15 the results of the diagnostic tests carried out on the device 14 (including details of the hardware components, firmware, software types and versions) and, preferably, also the operational history of the device 14 or of relevant components of the device 14. Harvested data could include also data relating to usage of the device 14 by the client 12, for example usage of any particular software application in the case where the device 14 is a computer.

Once the data has been received and stored, the web application 15 returns to the client 12 a unique identification code which identifies the URL of a web page where the client's data can be obtained. This unique identification code is transmitted to the client 12 which, in this embodiment, is then displayed on the display 32. In this embodiment it is preferred that the code is a simple code, such as a six-digit number, which the user 12 can then dictate to the support agent 10 over the telephone line 30 or can transfer to the agent 10 by means of a touch tone telephone. A suitable system is described in the applicant's earlier European patent application no. EP-A-1,256,144.

It is also envisaged that the identification code provided by the web application 15 could be a complex electronic sound of a type which can be transmitted through a telephone link (wired or wireless as the case may be). Such an electronic sound would be of a type which varies in pitch, frequency and/or spacing and which can be transmitted by the client 12 through the telephone link 30 to a receiver in the support agent's computer 24. Thus, transmission of the code can be made automatically through the communication link 30 with the client 12 and support agent 10, reducing the risk of an incorrect code being given to the support agent 10. An example of such an electronic sound is described in the applicant's German patent application no. DE 100 08 0674 A1.

The client's data is directly accessible to the support agent 10 by the communication link 26 between the agent's computer 24 and the web server 16. Thus, at the same time as communicating with client 12 over the telephone line 30, the support agent 10 can view the data obtained from the client's device 14 stored in the web application 16. Armed with this data, the support agent 10 can understand the problems experienced by the client 12 and can assist in resolving the problems with the device 14.

As shown in the FIGURE, the web application 15 also has access to a comparison database 20 which enables the support agent 10 to compare the harvested data from the client device 14 with "correct" data stored in the database 20. If it is established that the data harvested from the client's device 14 is in some way corrupted, the support agent 10 has the ability to control the web application 15 to transfer the correct data or software directly to the client's device 14 by means of the communications link 18 established between the client device 14 and the web application 15.

Similarly, the preferred embodiment provides an update database 22 which has stored therein the most recent versions of software and firmware relevant to the client device 14. Again, if it is established that any software or firmware in the client device 14 is out of date, the agent 10 can command web application 15 to replace that software or firmware with the most recent updated version.

Each of the databases 20 and 22 can be incorporated in the web application 15 or could be provided externally, such as by one or more third party sources (such as the manufacturers).

Thus, the system provides the ability to transfer to the web application 15 the relevant data relating to the client device 14, even though the state of operability of the client device 14 may be much reduced, and does so in a manner which requires little user input or understanding of the operation of the device 14. It also enables the support agent 10 to make changes to the software or firmware within the client device 14 without requiring direct assistance from the client 12 as is the case with most current support services.

With respect to the identification code used to identify the memory location of the collected client data in the web application 15, it is envisaged in an alternative embodiment that the client 12 could provide that code to the web application 15. In one example, the code could be the manufacturer's serial number of the device 14, which the client would communicate to the web application 15, either automatically through the diagnostic/data harvesting engine 21 or by any other suitable means. It is envisaged in such cases, that the web application 15 would check the client's code for uniqueness with other codes currently being used in other support calls. As long as the code is deemed unique, the application 15 would use the code to identify the URL of the relevant web page and would inform the client, so that the client can then provide the code also to the support agent 10.

We claim:

1. A method of supporting remotely a user electronic device having an operating system for operating the device, including the steps of providing a diagnostic and/or data harvesting engine for the electronic device which includes at least one procedure for diagnosing the operational state of the device and/or harvesting data relating to the device; providing independent Internet access software which accesses the Internet from the user electronic device independently of the operating system of the device; using the independent Internet access software to access a support website; transmitting to the website the results of the procedure for access by a support service; and accessing by a support person said data through the support website.

2. A method according to claim 1, wherein the support website has a fixed Internet address.

3. A method according to claim 1, wherein the method includes the step of transmitting system configuration to the support service.

4. A method according to claim 1, wherein the independent Internet access software includes at least one of a LAN driver, a TCP/IP stack and an HTTP stack.

5. A method according to claim 1, wherein the independent Internet access software provides access by one of FTP, TELNET and SOCKS 4/5.

6. A method according to claim 1, wherein the independent Internet access software uses one of DHCP and static IP to obtain the web site address.

7. A method according to claim 1, wherein the independent Internet access software is provided from one or more of a boot disc, a hidden partition in a hard disc drive of the device, a LAN connection, a USB boot device and ROM.

8. A method according to claim 1, wherein the independent Internet access software is copied from the proxy and IP settings from the operating system of the device during normal functioning of the device.

9. A method according to claim 1, wherein the website includes a web application and the method further includes the web application establishing a unique identifier for identifying a URL of the web application where the results of the procedure can be obtained and transmitting the identifier to a user of the device.

10. A method according to claim 9, wherein the identifier is one of a numerical code, an alphanumerical code and a sound.

11. A method according to claim 1, wherein the website includes a web application and wherein the step of providing for the support service to carry out repair or replacement of software or firmware of the device occurs through the web application.

12. Apparatus for supporting remotely a user electronic device having an operating system for operating the device, including a diagnostic and/or data harvesting engine for the electronic device which includes at least one procedure for diagnosing the operational state of the device and/or harvesting data relating to the device, independent Internet access software which accesses the Internet from the user electronic device independently of the operating system of the device, a transmission unit operable to use other Internet access software of the device or said independent Internet access software to access a support web application and to transmit to the web application the results of the procedure for access by a support service, said results being accessible by a support person through a website of said support web application.

13. Apparatus according to claim 12, wherein the independent Internet access software is provided from one or more of a boot disc, a hidden partition in a hard disc drive of the device, a LAN connection, a USB boot device and ROM.

14. Apparatus according to claim 12, wherein the engine is operable to copy for the independent Internet access software the proxy and IP settings from the operating system of the device during normal functioning of the device.

15. Apparatus according to claim 12, wherein the web application is operable to establish a unique identifier for identifying a URL of the web application where the results of the procedure can be obtained and to transmit the identifier to a user of the device.

16. Apparatus according to claim 15, wherein the identifier is one of a numerical code, an alphanumerical code and a sound.

17. Apparatus according to claim 12, including at least one of a comparison database and an update database coupled to the web application for providing correct versions and updates, respectively, of software and firmware.

18. Apparatus according to claim 17, wherein the support service is enabled to carry out software and firmware updates and corrections to the device through the web application.

19. A method of supporting remotely a user electronic device having an operating system for operating the device, including the steps of providing a diagnostic and/or data harvesting engine for the electronic device which includes at least one procedure for diagnosing the operational state of the device and/or harvesting data relating to the device; providing independent Internet access software which accesses the Internet from the user electronic device independently of the operating system of the device; using other Internet access software of the device or said independent Internet access software to access a support website; transmitting to a web application functioning on a website the results of the procedure for access by a support service; establishing a unique identifier for identifying a URL of the web application where the results of the procedure are located, for transfer to the support service.

20. Apparatus for supporting remotely a user electronic device having an operating system for operating the device, including a diagnostic and/or data harvesting engine for the electronic device which includes at least one procedure for diagnosing the operational state of the device and/or harvesting data relating to the device, independent Internet access software which accesses the Internet from the user electronic device independently of the operating system of the device, a transmission unit operable to use other Internet access software of the device or said independent Internet access software to access a support web application and to transmit to the web application the results of the procedure for access by a support service; one of a user of the device and the web application being operable to establish a unique identifier for identifying a URL of the web application where the results of the procedure can be obtained for transfer to the support service.

* * * * *